Oct. 11, 1932.  F. JUDGE  1,881,651
GAUGE
Filed June 18, 1930
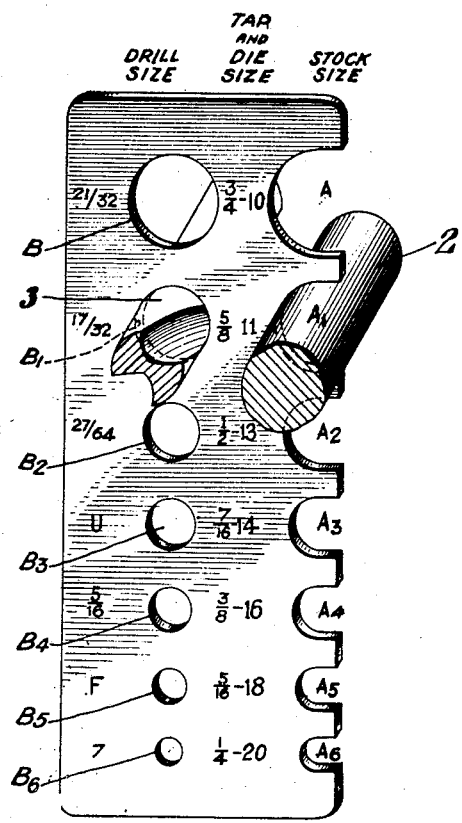

Patented Oct. 11, 1932

1,881,651

UNITED STATES PATENT OFFICE

FRANKLIN JUDGE, OF GREENFIELD, MASSACHUSETTS, ASSIGNOR TO GREENFIELD TAP AND DIE CORPORATION, A CORPORATION OF MASSACHUSETTS

GAUGE

Application filed June 18, 1930. Serial No. 461,866.

This invention relates to a gauge for taps and dies, and the object of the invention is to provide a gauge for quickly and accurately determining the properly cooperating size of the drill, tap, stock and die for mating threads, such as those of a bolt and nut.

In the accompanying drawing illustrating the invention the gauge is shown measuring a cooperating drill and stock, and at the same time determining the proper tap and die size.

In selecting the elements of a threaded combination, such as a bolt and its nut, it is essential to have not only the right size of tap and die, but the right size of hole (drill) for the tap and the right size of stock (bolt) for the die. The properly selected drill and stock sizes determine the correct corresponding tap and die, so that the gauging of the drill and stock makes it possible to complete the parts of the combination by simply selecting the corresponding die and the mating tap.

In my gauge device the stock (bolt, rod, etc.) is measured by the fixed jaw opening $A$, $A_1$, $A_2$, $A_3$, etc., and at the same time the cooperating drill may be gauged by the circuit hole $B$, $B_1$, $B_2$, $B_3$, etc., immediately adjacent the particular jaws fitted by the bolt. For instance, with a stock 2 fitting the 5/8" jaws $A_1$ the cooperating drill 3 determined by the adjacent hole $B_1$ will be $\frac{17}{32}$" in diameter and will give the proper opening for threading internally by a 5/8" tap to receive the threads formed on the stock 2 by a 5/8" die.

By thus providing a stock gauge and drill gauge and pairing these together, all of the sizes for the complete threaded combination are easily and instantaneously determined with precision and by a single instrument. It is not necessary to use a plurality of different devices with chances for mistakes and confusion as in the prior art, nor to make separate readings for the different parts. A single dimension, "5/8 inch", for instance, gives the stock, drill, tap and die. Assuming any one of these, all three of the others are immediately determinable in proper cooperative combination by my gauge.

I claim:

A gauge device in the form of a plate comprising a series of fixed gauge jaws having graduated spaces between them along one edge of the plate dimensioned and designated to measure thicknesses or diameters of stocks of material for threading by a die correspondingly designated on said plate, and a cooperating series of graduated circular holes within the body of the plate dimensioned and designated to correspond to the diameters of the holes to be drilled for threading to mate with said threaded stocks, each hole being immediately adjacent to and paired with its corresponding stock gauge jaw space so as to be similarly designated and to permit either the stock gauge or the drill gauge to determine the properly cooperating tap, die and drill or stock.

FRANKLIN JUDGE.